United States Patent [19]
Crow

[11] Patent Number: 5,627,546
[45] Date of Patent: May 6, 1997

[54] COMBINED GROUND AND SATELLITE SYSTEM FOR GLOBAL AIRCRAFT SURVEILLANCE GUIDANCE AND NAVIGATION

[76] Inventor: Robert P. Crow, 4725 Bywood Ct., Colorado Springs, Colo. 80906

[21] Appl. No.: 523,348

[22] Filed: Sep. 5, 1995

[51] Int. Cl.⁶ .................................................. H04B 7/185
[52] U.S. Cl. ........................... 342/352; 342/32; 342/49; 342/353; 342/456; 364/439; 364/451
[58] Field of Search ............................ 342/32, 352, 34, 342/49, 353, 455, 456; 364/439, 451, 429, 461

[56] References Cited

U.S. PATENT DOCUMENTS

| | | | |
|---|---|---|---|
| 3,678,387 | 7/1972 | Wilson | 325/4 |
| 4,445,118 | 4/1984 | Taylor et al. | 343/357 |
| 4,454,510 | 6/1984 | Crow | 343/5 |
| 4,455,651 | 6/1984 | Baran | 370/104 |
| 5,099,245 | 3/1992 | Sagey | 342/357 |
| 5,222,099 | 6/1993 | Hori et al. | 375/1 |
| 5,311,194 | 5/1994 | Brown | 342/357 |
| 5,402,442 | 3/1995 | Ishigaki | 375/200 |
| 5,467,282 | 11/1995 | Dennis | 364/449 |

OTHER PUBLICATIONS

Paper –Robert P. Crow –"Integrated Global Surveillance and Navigation System" –presented to Institute of Navigation Convention (Jun. 4, 1994) –(copy attached).

*Primary Examiner*—Thomas H. Tarcza
*Assistant Examiner*—Dao L. Phan

[57] ABSTRACT

The present invention provides a combined ground and satellite system for global aircraft surveillance, navigation, landing guidance and collision avoidance which comprises a satellite subsystem consisting of both a satellite constellation and associated ground stations, and a ground subsystem consisting of a network of ground stations, together with an airborne subsystem comprised of a transponder unit located in each of the aircraft using the system. A high speed two-way data link is provided between each of the subsystems using spread spectrum technology to permit overlaying and operation of the system in an existing band of narrow channels with minimum mutual interference. The system of the invention is reliable because of the redundant subsystems, and is not subject to failure. Also, the system provides for computations to be made on the ground, rather than in the aircraft, thereby reducing the size and complexity of the airborne equipment. The system also achieves a high degree of precision, as compared with the prior art systems. The system also provides air/ground data communication.

15 Claims, 5 Drawing Sheets

IGSANS SPREAD SPECTRUM LINK BANDS OVERLAYING THE TACAN/DME CHANNELS

| SYNC | FUNCTION | ADDRESS | LAT/LONG | ALTITUDE | MISC |
|---|---|---|---|---|---|
| 0 | 6 | 30 | 72 | 84 | 96 |

TYPICAL INTERROGATION PULSE FORMAT

| SYNC | FUNCTION | ADDRESS | ALTITUDE | MISC |
|---|---|---|---|---|
| 0 | 6 | 30 | 42 | 48 |

TYPICAL REPLY PULSE FORMAT

COMBINED GROUND AND SATELLITE SYSTEM FOR GLOBAL AIRCRAFT SURVEILLANCE GUIDANCE AND NAVIGATION

BACKGROUND OF THE INVENTION

The present invention is directed to an integrated global aircraft surveillance and navigation system having capabilities beyond those of the system described in U.S. Pat. No. 4,454,510 which issued Jul. 12, 1984 in the name of the present inventor. That patent discloses an aircraft surveillance, navigation, landing guidance and collision avoidance system which takes the form of a two-way data communication link between each of a multiplicity of controlled aircraft and a ground station. The system described in the patent also includes appropriate measuring equipment at the ground station which provides three-dimensional position data on the ground for aircraft control purposes, and which also provides three-dimensional position data in the aircraft for navigation, landing guidance and collision avoidance purposes. A two-way air/ground data link is also provided for miscellaneous data and control purposes.

Specifically, the present invention is concerned with a combined ground and satellite system for providing precise global aircraft navigation, surveillance, landing guidance, collision avoidance, and data linkage with a ground-based system, and which has capabilities beyond those of present day Global Positioning Systems (GPS).

Global civil aviation is rapidly moving toward widespread utilization of the prior art military Global Positioning System (GPS) and the civil version Global Navigation Satellite System (GNSS) yet to be implemented, both of which have substantial navigation advantages over previous systems. However, although the GPS-based landing guidance and dependent surveillance systems offer major advantages over the previously existing systems, there are critical shortcomings in present day GPS systems which involve integrity, availability and security. These shortcomings cannot practically be solved with the GPS-based systems or with the GNSS-based systems. In the GPS-dependent surveillance system, aircraft-derived GPS position data is transmitted to the ground by way of a constellation of communications satellites. It has been found that a constellation of eight geo-stationary and polar-orbiting satellites are sufficient to provide global coverage with redundancy in case of a satellite outage. A GPS-equipped aircraft may be interrogated by an Air Traffic Control (ATC) ground facility by way of one of the communications satellites, utilizing a discrete address, and the aircraft then replies by sending data representing its latitude/longitude, altitude and miscellaneous details using the same satellite link. Therefore, aircraft three-dimensional position data is made available to the Air Traffic Control (ATC) regardless of where the aircraft is located with respect to the earth.

Once the GPS communications satellite constellation referred to above is established for surveillance, means for global collision warning/avoidance is also available. The addition of a receiver on board the aircraft which operates on the aircraft-to-satellite up-link frequency enables all the aircraft in the vicinity to receive three-dimensional position data. This data can be processed for traffic environment display and horizontal, as well as vertical, escape maneuvers.

Although the GPS-based global functions such as those listed above represent distinct advances over the previously-used systems, there are many reasons for civil aviation to advance beyond GPS or GNSS-based systems. Some of these reasons are as follows:

A. The GPS-dependent global surveillance depends on accurate GPS positions from all aircraft. If there is a positional error from one aircraft, for whatever reason, a potential conflict with other aircraft in the vicinity arises which could lead to disaster. On the other hand, position data for a number of aircraft in an area derived from a common ground or satellite source, as is the case in the system of the present invention, is not subject to such a disastrous result.

B. The collision warning/avoidance function available in the GPS is superior to existing Threat Collision Avoidance Systems (TCAS) in that accurate relative positions are known in the GPS system of each aircraft, enabling cockpit traffic environment display, and horizontal as well as vertical escapes to be made. But this is also subject to the problem discussed in the previous paragraph, that is, the problem of potential aircraft conflicts if one aircraft reports an erroneously derived GPS position.

C. Although differential GPS-based landing guidance appears to be attractive from many aspects, it falls short in at least required integrity and availability with respect to existing Instrument Landing System (ILS) guidance. Moreover, with the multiple satellite-to-aircraft and ground-to-aircraft links required and the myriad of airborne GPS computations and corrections necessary, a heavy burden is placed on the equipment and processing in the aircraft, and not in the ground station where it should be.

D. Any satellite system is subject to jamming, either intentional or unintentional, and the complete dependence on GPS for global navigation, surveillance, landing guidance and other aviation functions has a tendency to lead to disaster.

In papers presented to the Institute of Navigation convention on Jun. 28, 1984 and Jun. 4, 1994, the present inventor described a new type of global surveillance and navigation system, which he designated an Integrated Global Surveillance and Navigation System (IGSANS). This system overcomes the drawbacks of the prior art GPS and GNSS-type systems, including those discussed in the preceding paragraphs.

The Integrated Global Surveillance and Navigation System (IGSANS) to be described herein consists of a satellite constellation and associated ground stations (satellite subsystem), and a ground station network (ground subsystem), each providing aircraft position data to an airborne subsystem. The basic functions provided by the IGSANS to be described are as follows: (a) precise global three-dimensional aircraft position for ATC surveillance; (b) precise global area navigation, pilot-selectable or standard routes, including great circle; (c) precise three-dimensional aircraft positions available globally to all aircraft in an area for collision warning/avoidance, and one which permits horizontal as well as vertical escapes; (d) a high speed two-way data link for aircraft requests, instructions, weather/runway conditions, etc.; and (e) in terminal areas, precise and versatile multi-runway landing guidance capabilities, including auto-flare guidance to touchdown and roll-out for all aircraft, with a high degree of freedom from multi-path errors.

It may be seen from the character of the IGSANS functions that aircraft position determination and data linking are at the heart of the system. Position determination via the satellite subsystem is accomplished with measurement of distances between the aircraft and three or more satellites of known position. The area satellite subsystem ground station transmits a digitally encoded and discretely addressed interrogation pulse concerning a particular aircraft to a satellite which, in turn, repeats the pulse to the addressed aircraft. The aircraft's digitally encoded reply pulse is received by three or more satellites, which again repeat the pulses to the satellite ground station. Precise time delay measurements between the interrogation and reply pulses allow the ground station to compute the precise aircraft position. In the case of the ground subsystem a facility in the vicinity of the aircraft transmits a similar discretely-addressed interrogation pulse to the aircraft. The time delay for the aircraft reply is measured to determine distance, and the incident angle of the reply signal wave front is measured by an interferometer antenna array to determine the precise azimuth angle.

The present invention provides an improved Integrated Global Surveillance and Navigation System (IGSANS) which is constructed to meet all the requirements of global ATC surveillance, navigation and collision warning/avoidance, precise landing guidance and high speed data link functions. The improved system provides a combined ground/satellite based system which results in substantial cost savings in both airborne and ground/satellite facilities and yet achieves the desired results discussed above.

The specific objectives of the present invention include the following:

A. to provide an improved combination ground and satellite system which utilizes spread spectrum technology to provide precise global navigation, surveillance, collision avoidance, landing guidance and data link capabilities;

B. to provide such an improved combination ground/satellite system which utilizes spread spectrum technology to identify specific ground network stations or specific satellite area beams;

C. to provide such an improved combination ground/satellite system which utilizes spread spectrum technology to permit overlaying and operating of the system in an existing band of narrow band channels with minimal mutual interference;

D. to provide such an improved system having ground facilities which utilize interferometer angular measurements and spread spectrum technology to identify the facility and provide precise three-dimensional position measurements for landing guidance; and E. to provide such an improved system having airborne transponder equipment which communicates with ground/satellite subsystems utilizing spread spectrum technology to provide precise aircraft navigation, surveillance, collision avoidance, landing guidance and data link capabilities.

DETAILED DESCRIPTION OF THE IGSANS SYSTEM OF THE INVENTION

The improved Integrated Global Surveillance and Navigation System (IGSANS) of the invention comprises three subsystems, namely, a satellite subsystem, a ground subsystem, and an airborne subsystem.

Figure 1:
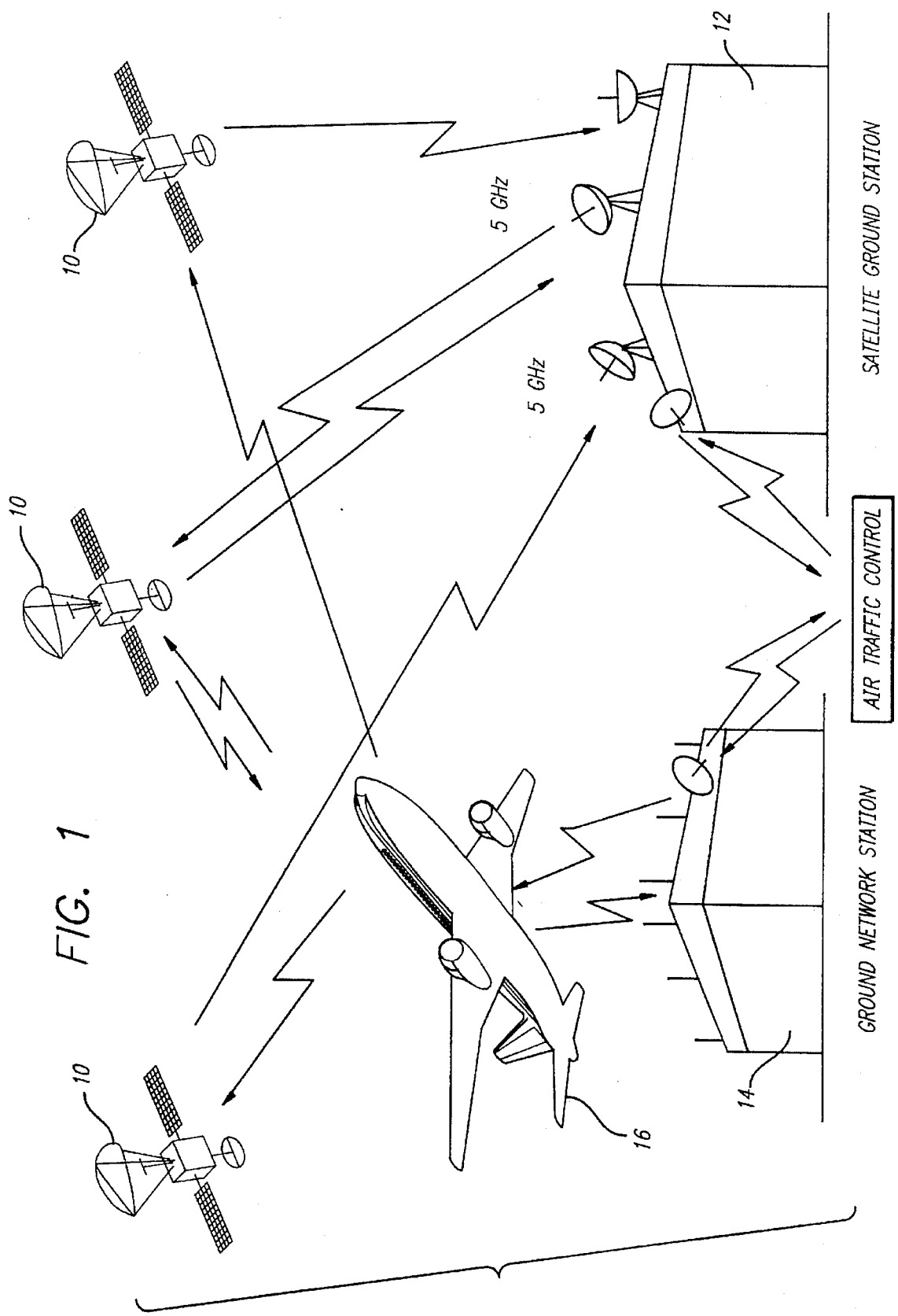
FIG. 1 is a schematic illustration of the ground-satellite, aircraft-satellite, and the ground-aircraft links for total operation of the system of the invention.

The satellite subsystem consists, for example, of a plurality of satellites, such as the satellites designated 10 in FIG. 1, and a plurality of ground stations, such as the ground station designated 12 in FIG. 1. The ground subsystem is made up of a network of ground stations, such as ground station 14 in FIG. 1, and the airborne subsystem is included in each of the user aircraft, such as the aircraft designated 16 in FIG. 1.

Figure 2:
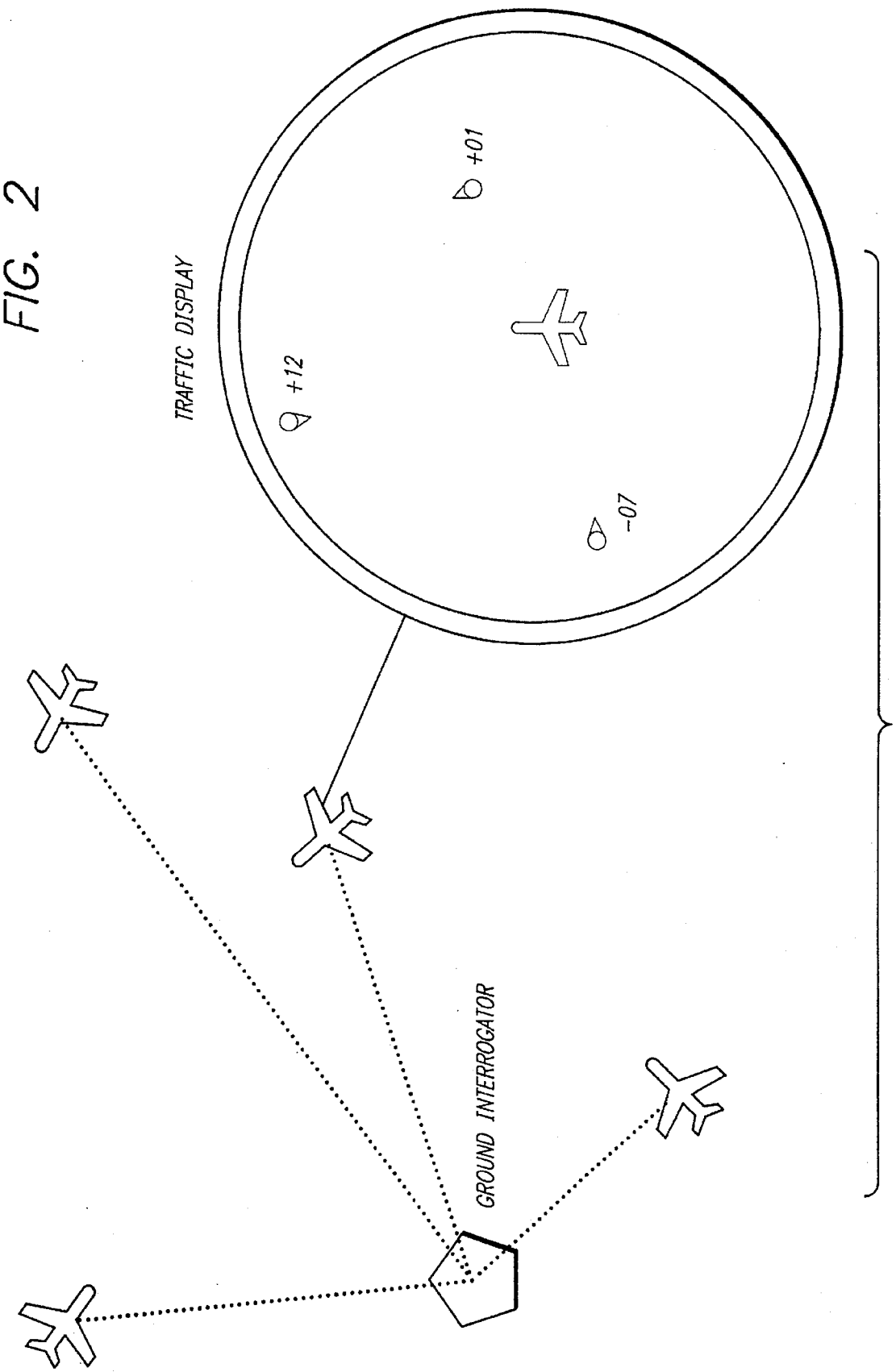
FIG. 2 is an illustration of a type of aircraft traffic environmental display possible with the IGSANS of the present invention as showing precise relative positions of traffic in the area.

In the case of both the satellite and ground subsystems, the aircraft replies from the airborne subsystem in an addressed aircraft includes altitude data from the reporting altimeter in the aircraft, which data may be correlated with the satellite-derived altitude. The data from the aircraft is converted in the ground stations to latitude/longitude and altitude determinations, and the resulting data is transmitted to the addressed aircraft airborne subsystem as part of the succeeding interrogation pulse for navigational purposes. A second navigational output is also possible, with data linking of a desired way point to the ground facility network, and the ground facility network processes and transmits to the aircraft data concerning course deviation and distance to the way point, these being the basic parameters for flight navigation. In addition, the latitude/longitude and altitude data concerning the addressed aircraft are also received by other aircraft in the vicinity of the addressed aircraft. Thus, the precise positions of all aircraft in the area are known to one another with respect to their own position, and suitable processing can provide the pilot of a traffic environment display, such as shown in FIG. 2, and data for horizontal as well as vertical escapes from potential conflicts.

The ground facility network of the ground subsystem provides redundant backup for any failure in the satellite subsystem, however, at least four satellites should always be in view of the aircraft for this purpose. Conversely, any total failure of a ground station, leaving a hole in the coverage, is filled with the redundant satellite coverage. Moreover, any intentional or unintentional jamming of an up-link satellite area beam receiver has a minimum effect because of the ground network coverage of the affected area. In fact, because of the effective backup provided in the system of the invention, it is unlikely that the satellite subsystem would ever become a target for jamming. Accordingly, the dual ground/satellite network of the IGSANS of the invention provides the necessary backup redundancy where needed.

In the terminal area, the addition of a vertical interferometer antenna array and associated receiving and processing equipment in the IGSANS ground subsystem station enables it to provide precise landing guidance with capabilities that far exceed, or are impossible with, ILS or MLS in several important aspects. ILS and MLS are so-called air-derived systems; that is, a signal is transmitted from the ground that varies with angle (azimuth or elevation) and the particular angle at the aircraft must be interpreted by the aircraft unit.

Multipath and other factors produce uncorrectable errors with this common system form. Distance measurements are made with a separate airborne interrogator system (DME). IGSANS is a ground-derived system, and utilizes two-way communication with ground interrogators, determining precise aircraft angular and distance data on the ground, and forwarding that data to the aircraft on the succeeding interrogation. This permits several things to be done advantageously; none are possible with ILS or MLS.

(a) The azimuth and elevation measurement equipment used for landing guidance of the aircraft does not have to be placed at the traditional locations with respect to the runway. They can, for example, be placed at the optimum location near touchdown, and the distance and angle computed offsets applied to the measurements before transmission to the aircraft.

(b) Precise distances, known from each reply pulse, permits processing of the interferometer antenna array angular data to, in effect, focus on the aircraft, regardless whether it is in the near or far field of the array. This permits the elevation array, for example, to be placed to make precise measurements at only a few hundred feet from the aircraft in the critical flare and touchdown region, providing height measurement accuracies in "inches." Measurements can be made before and after passage of the facility by the aircraft.

(c) Azimuth and elevation angular measurements can be made immediately upon the rise of the reply pulse, thus eliminating any reflected, or multipath, signals arriving later with their deleterious effects. Such multipath effects from nearby buildings and aircraft have limited ILS accuracies at many airports. Similar problems also exist with MLS. With the IGSANS of the invention, any reflected signal having delays above a few nanoseconds are completely rejected.

(d) Angle processing algorithms can be utilized which reduce remaining multipath effects from single and multiple reflecting surfaces.

(e) Lineal horizontal and vertical path deviations, rather than angular deviations, are provided by the ground computation in the system of the invention when the aircraft is near or over the runway, providing more effective flight control.

(f) The ground offset Computational capability of the system of the invention enables a single facility to provide multi-runway landing guidance. That is, it is possible for a single facility to provide bi-directional guidance on a runway and also on a parallel or crossing runway.

Both the satellite and ground subsystems of the improved IGSANS operate in L-band for the aircraft data links, using the present Tactical Air Navigation/Distance Measuring Equipment (TACAN/DME) channels (978–1213 MHz) with a spread spectrum overlay.

The use of spread spectrum techniques in Global Positioning Systems (GPS) is known to the art. U.S. Pat. No. 5,402,442, which issued in the name of Ishigaki on Mar. 28, 1985, for example, points out that the electromagnetic waves transmitted from each of the GPS satellites include a carrier modulated with a spread-modulated signal obtained by spread-modulating a navigation message using two kinds of diffusion codes, namely, C/A (Clear and Acquisition) code and P (Precision) code, with C/A code and P code being different for each satellite. Each GPS satellite in the system transmits a signal whose spectrum is spread by two carriers, a so-called L/1 carrier, having a center frequency of 1.5754 GHz and a so-called $L_2$ carrier having a center frequency of 1.2276 GHz.

An earlier United States Pat. No. 5,222,049, which issued Jun. 22, 1993 in the name of Hori, also describes a known Global Positioning System (GPS) in which a method of spread spectrum modulation is employed to process satellite signals, in which a satellite signal is transmitted in a state where 50-bps orbit parameter data (inclusive of orbit data to indicate the time and position of the satellite) are processed by spread spectrum modulation in accordance with a pseudo-random noise code (e.g., GOLD code) having a chip speed of 1.023 MHz and a period of 1 microsecond, and two carriers of 1575.42 MHz and 1227.6 MHz are processed by orthogonal phase modulation (two-phase PSK modulation).

Other Global Positioning Systems (GPS) which also use spread spectrum techniques are described, for example, in U.S. Pat. Nos. 4,445,118 and 4,455,651. A definitive reference book on spread spectrum technology is *Digital Communications and Spread Spectrum Systems* by R. E. Ziemer and R. L. Peterson, Macmillan Publishing Company, New York, N.Y. 1985.

Figures 3, 4A, 4B:
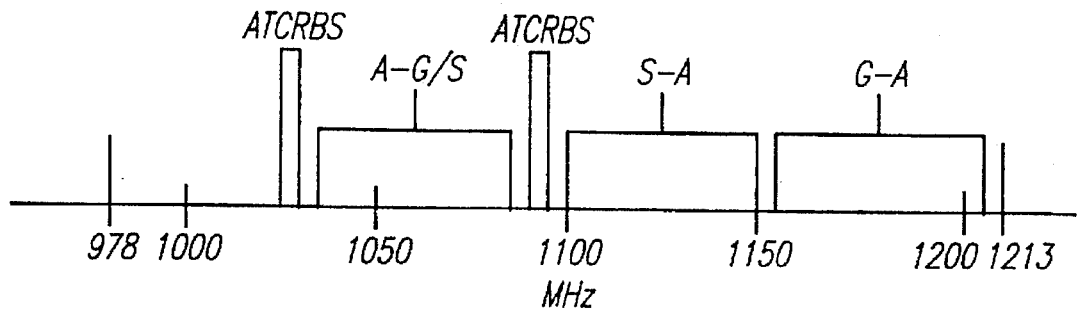
FIG. 3 is a representation of the spread spectrum link bands overlaying the TACAN/DME channels in the IGSANS.
FIG. 4a is a representation of a typical interrogation pulse format.
FIG. 4b is a representation of a typical reply pulse format.

The spread spectrum bands for the three links (ground-to-air, satellite-to-air, and air-to-ground and air-to-satellite) utilized by the system of the invention in the TACAN/DME band is shown in FIG. 3. Each of the link bands is 50 MHz wide, and the bands are positioned between and above the Air Traffic Control Radar Beam System (ATCRBS) channels located at 1030 and 1090 MHz. A "direct-sequence" form of spread spectrum coding is utilized in the system of the invention having a "chip" length of approximately 10 nsec. The spread spectrum coding, in part, provides ground or satellite beam facility identification with different codes for each. Replies from the aircraft also use the same spread spectrum encoding as the interrogating satellite or ground facility. Other benefits of using the spread spectrum technology described above include improved range accuracy, reduced multipath effects and improved jam resistance. The same signal format is used for both the ground and satellite subsystems.

Conventional bi-phase or quadra-phase data coding is used, in conjunction with the higher speed spread spectrum coding, for both the interrogations and replies, with each data bit having a length of about 0.25 microseconds, the length of the spread spectrum code. Typical but not the only interrogation and reply pulse formats are shown in FIGS. 4a and 4b. The landing guidance interrogation format, for example, includes horizontal and vertical path deviations, but does not need latitude/longitude.

Interrogation rates of approximately three per second are utilized by the ground subsystem, except that in the terminal areas the rates are increased up to 50 per second in the final approach and landing zone. This is to provide less delay and more precise position averaging in those zones. The satellite subsystem utilizes an interrogation rate of approximately one per second. Therefore, continuous data of more than adequate rate are supplied by the system, instead of periodic "blurps" of data every four to fifteen seconds, as is the case with the prior art systems. Based on the interrogation pulse length of 25 microseconds, it is theoretically possible to transmit approximately 40,000 interrogations per second. However, in order to prevent overlapping and garbled replies from aircraft at different positions, a lower limit is desirable for practical interrogation scheduling particularly for the satellite subsystem.

As described above, the satellite subsystem consists of a constellation of satellites 10 (FIG. 1) and a series of ground stations, such as ground station 12 in FIG. 1. The ground stations interrogate and provide data communication with aircraft 16 in the area by way of the satellites 10. The satellite constellation consists, for example, of eight satellites in geostationary orbits, spaced 45 degrees in longitude, and five satellites in respective polar orbits spaced 90 degrees in longitude and 72 degrees in latitude at approximately the same altitude of 22,300 miles.

Figure 5:
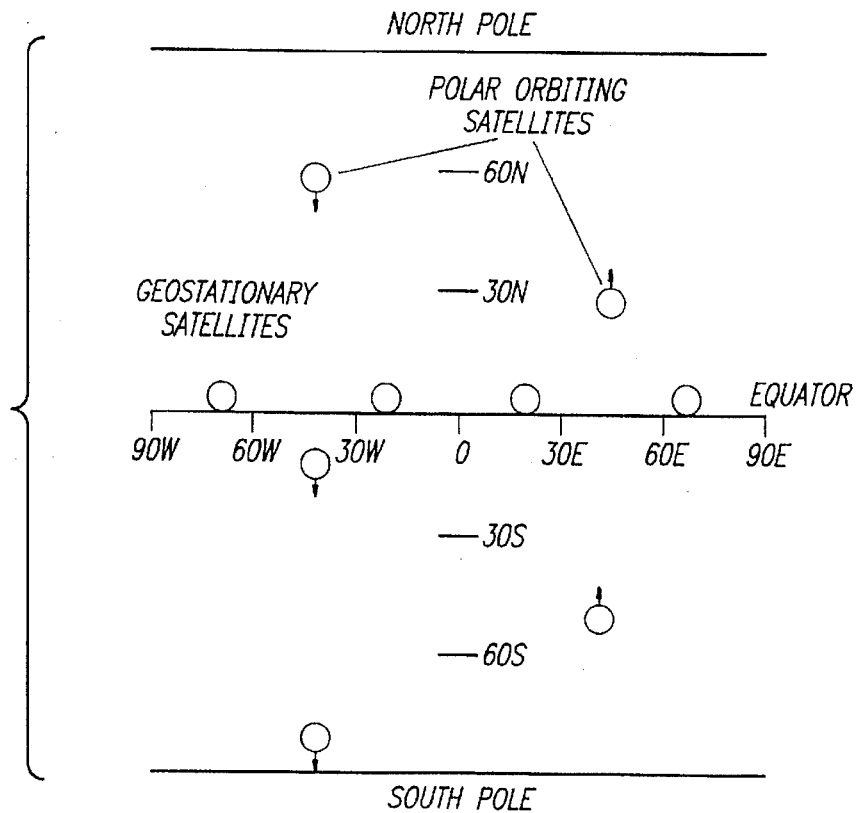
FIG. 5 is a representation of a partial satellite constellation shown in rectangular coordinates.

The satellite constellation is shown in rectangular form in FIG. 5 for a given time. The polar orbiting satellites rotate in longitude as well as latitude, while the geo-stationary satellites remain fixed. One of the reasons for the arrangement shown in FIG. 5 is that for a majority of aircraft in the middle latitudes, a major portion of the interrogations and replies occurs by way of the geo-stationary satellites, and the area ground station antennas pointed at those satellites can be fixed in angle. However, the polar orbiting satellites are needed to provide more accurate latitude position near the equator and more accurate altitude data for aircraft at higher latitudes, and also to provide coverage in the polar regions. At least three of the geo-stationary satellites are in view (more than 6 degrees above the horizon) and receive interrogations and transmit replies from any aircraft up to latitudes of approximate 70 degrees with respect to the associated area ground station 12. The polar orbiting satellites, operating at the same altitude as the geo-stationary satellites, also have a similar area beam matrix and other equipment as the geo-stationary satellites. At least four polar orbiting satellites are in view from any aircraft location. Therefore, seven to nine satellites typically are in view from most aircraft except in the polar regions or in mountainous regions. Each of the satellites 10 in FIG. 1 have approximately nineteen beams aimed at the earth. These beams cover areas illustrated in FIG. 6. A cluster of nineteen feedhorns, each coupled to a transponder, direct a matrix of beams toward a large sector reflector in order to produce the earth's coverage area beams.

The satellite-ground links of the satellite subsystem utilize beamed transmissions and receptions, and therefore more than adequate signal-to-noise ratios are obtainable. However, with the aircraft-satellite links, the aircraft utilizes an omni-directional antenna with relatively low gain and, as a consequence, less margin is available. Table 1 lists a minimum performance power budget for each of the up and down links, showing their viability and requirements. The aircraft and satellite transmitter peak power levels listed have been demonstrated with solid-state production units. The satellite receiver front-end device is assumed to have thermo-electric cooling. The 50 MHz spread spectrum bandwidth and associated power gain over that for the 4 MB/s data rate is also shown. Greater margins are available with higher transmitter power levels, with a greater number of higher gain area beams and other performance improvements.

TABLE 1

| Aircraft/Satellite Links Power Budget | |
|---|---|
| Aircraft-to-Satellite Link | |
| A/C transmitter peak pulse power, 1000 w | +60.0 dBm |
| A/C antenna gain (4), pattern loss (3), cable loss (1) | 0.0 dB |
| Propagation loss, 25,000 miles at 1100 MHz | −185.5 dB |
| Satellite antenna gain, 19 beams at 4.5° | +31.3 dB |
| Minimum receiver input: | −94.2 dBm |
| Satellite receiver KTB, 130° K. equivalent, 50 MHz BW | −100.5 dBm |
| Spread spectrum power gain, 50/4 | +11.0 dB |
| Minimum S/N: | +17.3 dB |

TABLE 1-continued

| Aircraft/Satellite Links Power Budget | |
|---|---|
| Satellite-to-Aircraft Link | |
| Satellite transmitter peak pulse power, 3000 w | +64.8 dBm |
| Propagation loss, 25,000 miles at 1200 MHz | −186.3 dB |
| Satellite antenna gain, 19 beams at 4.5° | +31.3 dB |
| A/C antenna gain (4), pattern loss (3), cable loss (1) | 0.0 dB |
| Minimum receiver input: | −90.2 dBm |
| A/C receiver KTB, 350° K. equivalent, 50 MHz BW | −96.2 dBm |
| Spread spectrum power gain, 50/4 | +11.0 dB |
| Minimum S/N: | +17.0 dB |

Aircraft in any particular area are interrogated by a corresponding satellite area ground station 12 by way of a satellite area beam. The interrogations can be scheduled so that replies from aircraft in the area beam of the interrogating satellite are received in sequential order. This is so that none of the replies will overlap and be garbled. However, because of the different distant relations of the aircraft to several other satellites receiving the replies, it is possible that some of the replies from these satellites may overlap and be garbled. A statistical analysis with an assumed area traffic level of 2,000 aircraft replies per second and reply lengths of 13 microseconds has indicated that randomly spaced replies to a single satellite have a 95% probability of no overlapping replies. Aircraft replies from at least three satellites are required to obtain a three-dimensional position for the aircraft, and this reduces the probability of free replies to 90.3%. However, in the middle latitudes where heavy traffic occurs, at least seven satellites are in view and the probability of receiving ungarbled signals from three satellites is increased to 96.2%.

Figure 6:
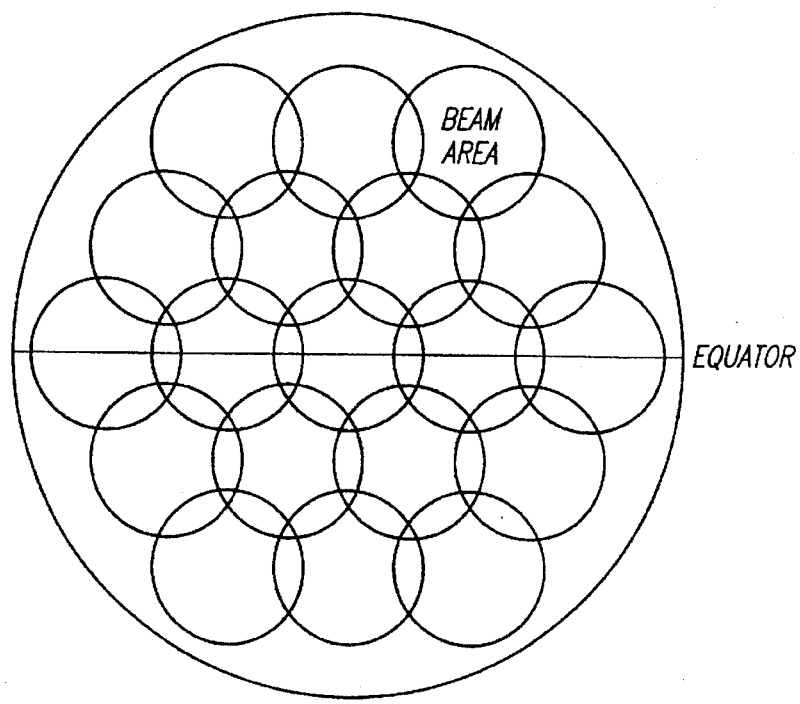
FIG. 6 is a representation of a 19-beam coverage of the earth's surface.

The satellite antenna for the satellite/aircraft links at L-band requires a parabolic dish of approximately 14 feet in diameter to produce the array of 4.5° beams. However, a sector dish may be more practical and would be approximately 20 feet across to obtain the equivalent area. An array of nineteen feedhorns, in conjunction with such a parabolic dish, would form the area beams covering the earth's surface, as illustrated in FIG. 6. A much smaller dish, with a 10° to 15° beam from the satellite, would enable the satellite to communicate with an area ground station 12 even when the aircraft is located over an ocean or undeveloped land area. The area ground station has higher gain antennas for operation with specific satellites. The resultant satellite/ground links have sufficient gain margins to handle severe weather losses at C-band.

A clock which is used for the precise distance measurements is located in the area ground station 12. Although two round trips to the satellite totaling some 94,000 miles is involved to determine the satellite-to-aircraft distances, a clock accuracy of one part in $10^7$ provides a delay accuracy of 25 feet, which is adequate and easily available. The satellite-to-ground distances are continually monitored and corrected via interrogations from the ground stations to precisely located ground transponders.

As mentioned above, the ground subsystem is made up of a network of stations, such as station 14 in FIG. 1. The number of such stations required to cover the continental United States, for example, is less than for the present VORTAC and ATCRBS networks because the required coverage redundancy is provided in the system of the present invention by the satellite subsystem. The discretely addressed aircraft interrogations are programmed, knowing the distance from previous interrogations, in a manner such that the replies are received in sequence with no overlapping or garbling. The interrogations are omni-directionally radiated with no dependence on a rotating beam, as in the prior art systems, with its scheduling and traffic concentration limitations. The precise distance delays and angular measurements use well known techniques of pulse leading edge measurements. Slant-range corrections of all distance measurements are made before conversion to latitude/longitude and before any course deviations are computed.

The azimuth (or elevation) angle of the aircraft is determined by measuring the reply pulse signal with interferometer antenna and receiver arrays and associated processing equipment. Interferometry has been developed to a high degree with the availability of high speed processing equipment. The 360° azimuth omni-directional antenna array may take the form of a circular, three or four-sided linear, or crossed linear array. The ground ordering of the subsystem prevents aircraft replies from overlapping and garbling, and provides traffic capacities well beyond those presently encountered, namely, several thousand aircraft at three interrogations per second. There may be some overlapping coverage between ground facilities, and the ground ordered interrogations from two stations may overlap, but the spread spectrum coding of each facility in the system of the invention enables proper aircraft decoding in spite of such overlapping.

The airborne subsystem in the system of the present invention, unlike the ground and satellite subsystems, is relatively simple. The airborne subsystem includes an airborne unit which is basically a transponder, but with discrete addressing and spread spectrum encoded data represented in FIGS. 4a and 4b. A second receiver is included in the airborne unit for reception from the satellites. If the course deviation and distance data is utilized, only a navigation interface circuit is required for the flight director or automatic pilot. Landing guidance is also provided with such an interface. A processor is required for the collision warning/avoidance function, and a keyboard and display is required for the data link. The transmitter output is switched electronically to either a top or bottom antenna for its reply by the decoder output, indicating a ground or satellite interrogation.

Figure 7:
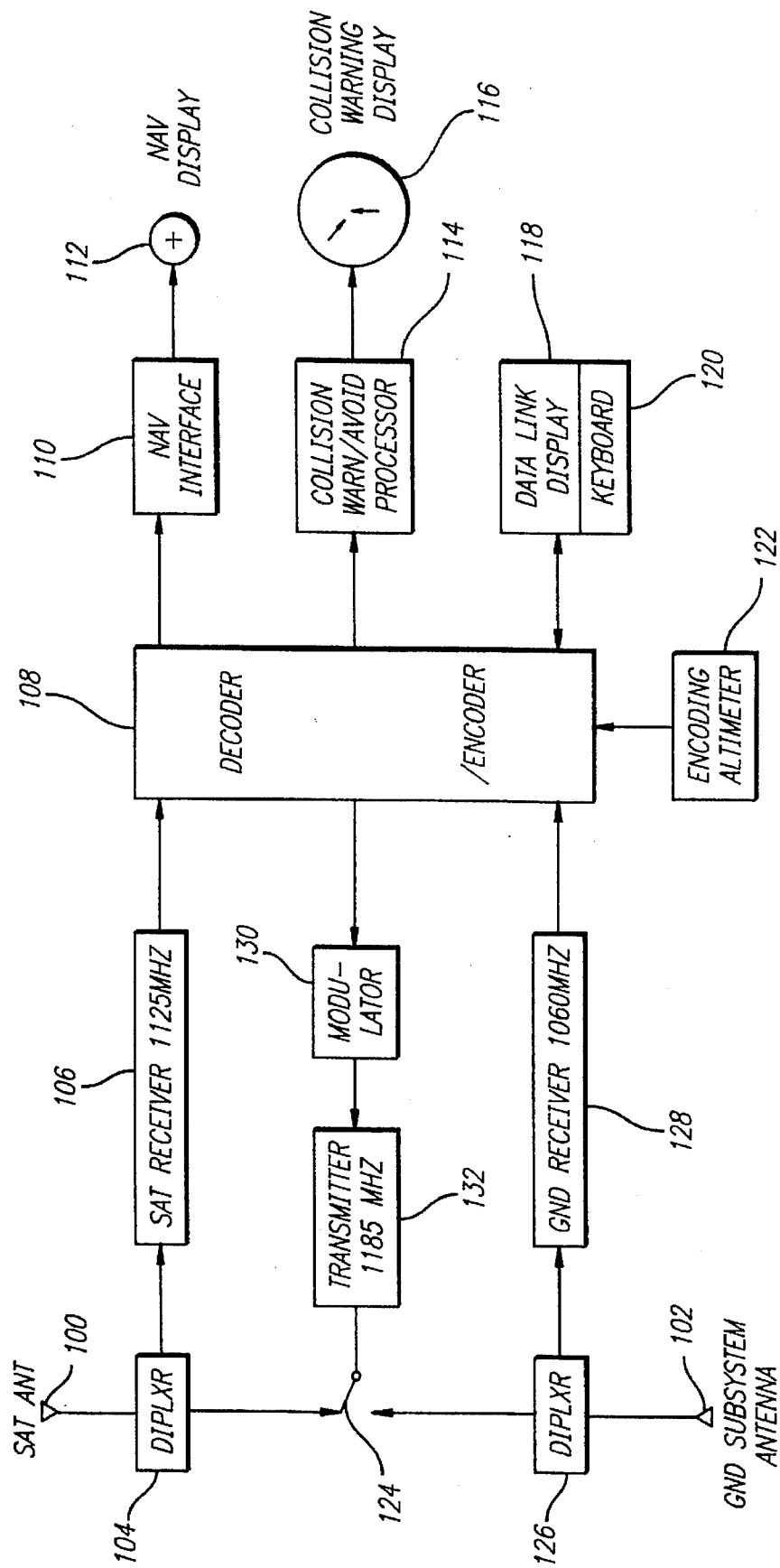
FIG. 7 is a block diagram of an airborne subsystem used in the IGSANS of the present invention.

The airborne unit is shown in block form in FIG. 7. As shown in FIG. 7, the airborne unit includes a top antenna 100 for communication with the satellites, and a bottom antenna 102 for communication with the ground subsystem. Antenna 100 is connected to a diplexer 104 which, in turn, is connected to a satellite receiver 106 (1125 MHz). The satellite receiver is connected to a decoder/encoder unit 108 which, in turn, is connected to a navigational interface 110 which supplies data to a navigation display 112. The decoder/encoder is also connected to a collision warn/avoid processor 114 which supplies data to a collision warning display 116. The decoder/encoder decodes and encodes both the high speed spread spectrum codes and the lower speed (4 MB/s) data codes embedded in the spectrum coding.

The decoder/encoder is also connected to a data link display 118 that is controlled by a keyboard 120. An encoding altimeter 122 is also connected to the decoder/encoder unit 108.

The decoder/encoder unit 108 is also connected to a modulator 130 which modulates a carrier generated by a transmitter 132 which is connected through an electronic switch 124 so that its output may be radiated either on the top antenna 100 to the satellites or on the bottom antenna 102 to the ground subsystem. The ground subsystem antenna 102 is connected to a diplexer 126 which, in turn, is connected to switch 124 and to a ground receiver 128 (1185 MHz). Receiver 128, in turn, is connected to the decoder/encoder 108.

The circuitry involved in the various blocks shown in FIG. 7 is well known, as is the functioning of the various blocks individually and in conjunction with the other blocks. For that reasons, it is believed that a more detailed representation of the airborne unit is not necessary for a complete understanding of the system of the present invention.

The single airborne unit shown in FIG. 7 replaces and provides improved functions over the multiplicity of independent units used in the prior art airborne systems, namely: VHF Omni-directional Range System (VOR); Distance Measuring Equipment (DME); Aircraft Traffic Control Transponder (ATCRBS); Instrument Landing System (ILS); Threat Collision Avoidance System (TCAS); and Automatic Direction Finder (ADF). Accordingly, the system of the invention requires less equipment and less processing, and yet provides an overall system superior to these existing systems and also to GPS or GNSS-based satellite systems, and one which is superior in performance over the prior art insofar as accuracy, integrity, availability, continuity and security is concerned. There is also substantial cost and maintenance savings in the ground subsystem of the system of the invention because of the fact that fewer ground stations are required. Also, savings are substantial in the satellite subsystem of the system of the invention, because of the fact that fewer satellites are required.

The invention provides, therefore, an improved combined ground and satellite system using spread spectrum technology to provide aircraft navigation, surveillance, landing guidance, collision warning/avoidance and data communication with a ground/satellite system, which has capabilities beyond those of the present day systems and which may be constructed and operated with more efficiency and at a reduced cost with respect to the prior art systems.

It will be appreciated that while a particular embodiment of the system of the invention has been shown and described, modifications may be made. It is intended in the claims to cover all modifications which come within the true spirit and scope of the invention.

I claim:

1. A combined ground and satellite system for providing aircraft guidance, said system comprising: a satellite subsystem which includes a constellation of satellites and a plurality of ground stations positioned at selected locations; a ground subsystem which includes a network of ground stations positioned at selected locations; and an airborne subsystem which includes a plurality of transponder units located in respective ones of aircraft utilizing the system; the transponder units of the airborne subsystem each including means providing a first spread spectrum band data link with the satellites and ground stations of the ground subsystem, the satellites each including means providing a second spread spectrum band data link with the airborne subsystem, and the ground stations of the ground subsystem each including means providing a third spread spectrum band data link with the airborne subsystem, each of said spread spectrum band data links including means providing a selected form of spread spectrum coding comprising a plurality of different codes to provide identification of individual ones of said satellites, and ground stations.

2. The combined ground and satellite system defined in claim 1, in which said data links have spread spectrum bands located in the present day TACAN/DME signal channels (978 MHz–1213 MHz) with spread spectrum overlay.

3. The combined ground and satellite system defined in claim 2, in which each of the three spread spectrum bands are of the order of 50 MHz wide.

4. The combined ground and satellite system defined in claim 3, in which said third data link has a spread spectrum band positioned between the first and second present day Air Traffic Control (ATC) signal channels of 1030 MHz and 1090 MHz respectively, and said second and first data links have respective spread spectrum bands positioned adjacent to one another above said second present day Air Traffic Control (ATC) signal channel (1090 MHz).

5. The combined ground and satellite system defined in claim 3, in which each of said three data links is a high speed type which obtains and provides precise three-dimensional aircraft position data for an addressed aircraft, said data being available not only to the addressed aircraft but also to other aircraft in the vicinity.

6. The combined ground and satellite system defined in claim 1, in which the ground stations of the satellite subsystem each includes means for transmitting interrogation signals to the transponder unit of a selected aircraft, and said ground stations of said satellite subsystem each including further means responsive to reply signals from the transponder unit of the selected aircraft to measure the distances between the selected aircraft and at least three of the satellites, and said ground stations of the satellite subsystem including further means for processing said reply signals to compute and transmit to the selected aircraft and to other aircraft in the vicinity latitude, longitude and altitude data concerning the selected aircraft.

7. The combined ground and satellite system defined in claim 6, in which the signals transmitted by said satellite subsystem ground stations comprise digitally encoded and discretely addressed interrogation pulses directed to a selected one of said satellites to be repeated to the selected aircraft thereby.

8. The combined ground and satellite system defined in claim 7, in which the ground stations of the satellite subsystem each include means for measuring the delay between said interrogation pulses and reply signals to determine said distances.

9. The combined ground and satellite system defined in claim 8, in which the ground stations of the ground subsystem each include an interferometer antenna array for measuring the incident angles of the wave fronts of the reply signals, and each including processing means coupled to the corresponding interferometer antenna for determining azimuth angles.

10. The combined ground and satellite system defined in claim 1, in which the ground stations of the ground subsystem each include means for transmitting way point data over said third data link to the airborne subsystems representing course deviation and distance to selected way points.

11. The combined ground and satellite system defined in claim 1, in which certain of said ground stations of said ground subsystem are located in terminal areas, and such terminal area ground stations each include a vertical interferometer antenna array and associated receiving and processing equipment to enable the system to produce and transmit precise landing guidance signals to the aircraft utilizing the system.

12. The combined ground and satellite system defined in claim 11, in which the processing equipment of such terminal area ground stations of said ground subsystem each includes means for computing distance and angle offsets to the outputs of azimuth and elevation measuring equipment installed at airports at which the aircraft are guided to landings.

13. The combined ground and satellite system defined in claim 1, in which the three subsystems each include means for transmitting interrogation and reply signals over said first, second and third spread spectrum band data links, with each such signal comprising digitally encoded and discretely addressed binary bit signals using bi-phase or quadra-phase coding in conjunction with high speed spread spectrum coding.

14. The combined ground and satellite system defined in claim 1, in which the individual aircraft of the airborne subsystem receive data from either the ground or the satellite subsystems, or both, and utilize this data for navigation, landing guidance, collision warning and avoidance, and information or instructions from Air Traffic Control.

15. The combined ground and satellite system defined in claim 1, in which the ground or the satellite subsystems, or both, provide three-dimensional position data on individual aircraft of the airborne subsystem for Air Traffic Control surveillance.

* * * * *